(12) United States Patent
Lores et al.

(10) Patent No.: US 11,431,702 B2
(45) Date of Patent: *Aug. 30, 2022

(54) AUTHENTICATING AND AUTHORIZING USERS WITH JWT AND TOKENIZATION

(71) Applicant: LendingClub Corporation, San Francisco, CA (US)

(72) Inventors: Fernando Lores, Oakland, CA (US); Albert Tam, Burlingame, CA (US)

(73) Assignee: LendingClub Bank, National Association, Lehi, UT (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/130,790

(22) Filed: Dec. 22, 2020

(65) Prior Publication Data

US 2021/0112052 A1  Apr. 15, 2021

Related U.S. Application Data

(63) Continuation of application No. 15/942,266, filed on Mar. 30, 2018, now Pat. No. 10,999,272.

(51) Int. Cl.
*G06F 7/04* (2006.01)
*H04L 9/40* (2022.01)
*H04L 9/32* (2006.01)
*G06F 15/16* (2006.01)

(52) U.S. Cl.
CPC ........ *H04L 63/0838* (2013.01); *H04L 9/3213* (2013.01); *H04L 9/3247* (2013.01); *H04L 63/0807* (2013.01); *H04L 63/102* (2013.01)

(58) Field of Classification Search
CPC ............. H04L 63/0807; H04L 63/0838; H04L 63/102; H04L 63/108; H04L 9/3213; H04L 9/3247

See application file for complete search history.

(56) References Cited

U.S. PATENT DOCUMENTS

| | | | |
|---|---|---|---|
| 9,800,580 B2 | 10/2017 | Zhang et al. | |
| 10,182,044 B1 * | 1/2019 | Praus | H04L 63/08 |
| 10,277,569 B1 * | 4/2019 | Barbour | H04L 9/0861 |
| 10,498,734 B2 * | 12/2019 | Erb | H04L 41/0893 |
| 10,536,277 B1 * | 1/2020 | Kruse | G06F 12/1408 |
| 10,608,997 B1 * | 3/2020 | Sethi | H04L 63/123 |

(Continued)

OTHER PUBLICATIONS

Lores, U.S. Appl. No. 15/942,266, filed Mar. 30, 2018, Notice of Allowance, dated Dec. 31, 2020.

(Continued)

*Primary Examiner* — Gary S Gracia
(74) *Attorney, Agent, or Firm* — Hickman Becker Bingham Ledesma LLP (57) ABSTRACT

Techniques are provided for using tokenization in conjunction with "behind-the-wall" JWT authentication. "Behind-the-wall" JWT authentication refers to JWT authentication techniques in which the JWT stays exclusively within the private network that is controlled by the web application provider. Because the JWT stays within the private network, the security risk posed by posting the JWT in a client cookie is avoided. However, because JWT is used behind-the-wall to authenticate a user with the services requested by the user, the authentication-related overhead is significantly reduced.

14 Claims, 5 Drawing Sheets

(56) References Cited

U.S. PATENT DOCUMENTS

| | | | |
|---|---|---|---|
| 2006/0075253 A1* | 4/2006 | Sonkin | G06Q 10/0631 713/184 |
| 2007/0107048 A1* | 5/2007 | Halls | H04L 63/0807 726/4 |
| 2010/0057774 A1* | 3/2010 | Pizano | G06F 21/53 726/2 |
| 2010/0077469 A1* | 3/2010 | Furman | G06F 21/41 726/8 |
| 2010/0125903 A1* | 5/2010 | Devarajan | H04L 63/102 709/224 |
| 2010/0306547 A1* | 12/2010 | Fallows | H04L 63/0815 713/178 |
| 2012/0254957 A1* | 10/2012 | Fork | H04L 9/3234 726/6 |
| 2014/0058945 A1* | 2/2014 | Stecher | G06Q 20/02 705/44 |
| 2014/0059693 A1* | 2/2014 | Stecher | G06Q 50/28 726/26 |
| 2014/0282989 A1* | 9/2014 | Young | H04L 63/0815 726/9 |
| 2016/0065555 A1 | 3/2016 | Branden et al. | |
| 2016/0094531 A1 | 3/2016 | Unnikrishnan et al. | |
| 2016/0127352 A1* | 5/2016 | Xu | G06F 21/62 726/8 |
| 2016/0164920 A1* | 6/2016 | Borovoy | G06F 21/44 726/1 |
| 2016/0248593 A1* | 8/2016 | Roth | H04L 9/14 |
| 2016/0277391 A1* | 9/2016 | Choyi | H04L 63/062 |
| 2016/0283740 A1* | 9/2016 | Roundtree | H04L 51/14 |
| 2016/0285874 A1* | 9/2016 | Smith | H04L 63/0807 |
| 2016/0294562 A1* | 10/2016 | Oberheide | H04L 9/0863 |
| 2016/0337369 A1* | 11/2016 | Sanso | H04L 63/0807 |
| 2016/0373543 A1* | 12/2016 | Alla | H04L 67/2842 |
| 2017/0111336 A1* | 4/2017 | Davis | H04L 63/029 |
| 2017/0141926 A1* | 5/2017 | Xu | H04L 9/3066 |
| 2017/0142108 A1* | 5/2017 | Zhang | H04L 63/0807 |
| 2017/0195457 A1* | 7/2017 | Smith, II | H04L 63/06 |
| 2017/0331813 A1* | 11/2017 | Lander | H04L 63/0815 |
| 2017/0346807 A1* | 11/2017 | Blasi | H04L 9/3213 |
| 2017/0346811 A1* | 11/2017 | Newell | H04L 9/3226 |
| 2018/0115542 A1* | 4/2018 | Dungen | H04L 63/0823 |
| 2018/0176203 A1* | 6/2018 | Wang | H04L 67/141 |
| 2018/0288047 A1* | 10/2018 | Zhang | H04L 63/0807 |
| 2018/0367306 A1* | 12/2018 | Bahety | H04L 9/3297 |
| 2019/0182242 A1* | 6/2019 | Aizikovich | H04L 63/0861 |
| 2019/0245704 A1* | 8/2019 | Pala | H04L 41/0803 |
| 2019/0306157 A1* | 10/2019 | Lores | H04L 9/3226 |

OTHER PUBLICATIONS

Lores, U.S. Appl. No. 15/942,266, filed Mar. 30, 2020, Office Action, dated Jun. 8, 2020.

* cited by examiner

AUTHENTICATING AND AUTHORIZING USERS WITH JWT AND TOKENIZATION

BENEFIT CLAIM

This application claims the benefit as a Continuation of application Ser. No. 15/942,266, filed Mar. 30, 2018, the entire contents of which is hereby incorporated by reference as if fully set forth herein, under 35 U.S.C. § 120. The Applicant hereby rescinds any disclaimer of claim scope in the parent application(s) or the prosecution history thereof and advise the USPTO that the claims in this application may be broader than any claim in the parent application.

FIELD OF THE INVENTION

The present invention relates to improving security of web-based software.

BACKGROUND

It is critical that software systems prevent users that are not authorized to perform an action from performing that action. For example, a software system that maintains medical records should allow only the users that are authorized to access a person's medical records to access those medical records.

Figure 1:
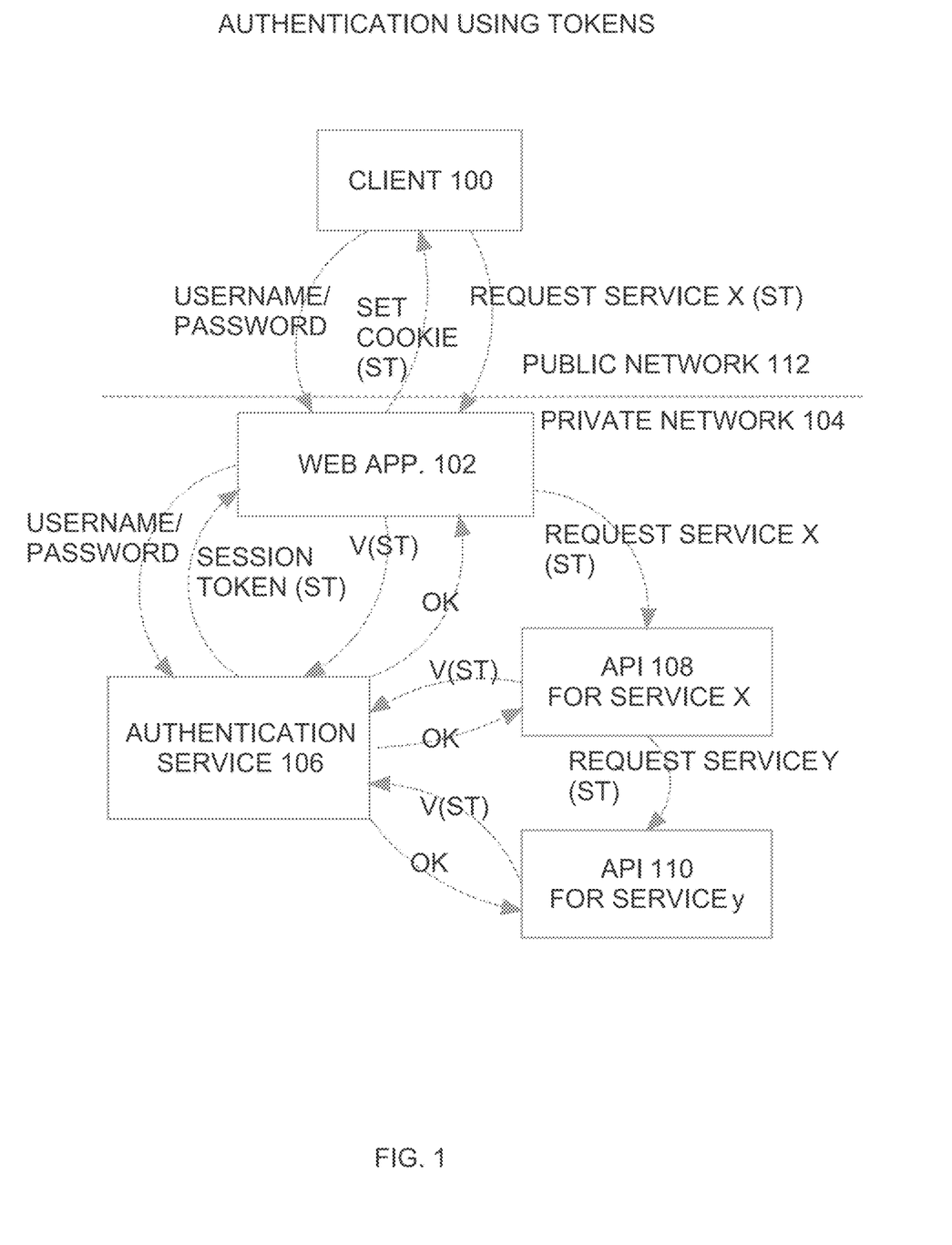
FIG. 1 is a block diagram of a web application system configured to authenticate using tokenization.

When the restricted action is an action performed by a web-based application, the security may be enforced using session tokens. FIG. 1 is a block diagram illustrating one way for a web-based application to enforce restrictions using session tokens. Referring to FIG. 1, client 100 represents a computing device that is executing a browser through which a user may sign on to a web application 102. The client 100 is on a public network (any network whose security is not controlled by the web application provider). On the other hand, the web application 102 can be called from the public network 112 but executes on a private/secure network (a network whose security is controlled by the web application provider).

In the initial sign-on process, the client 100 sends the user's authentication information (e.g. a username/password combination) to the web application 102. The web application 102 sends the authentication information to an authentication service 106. The authentication service determines whether the authentication information is valid. If authentication information is valid, the authentication service 106 creates a session token (ST), stores data indicating that the ST is valid until a certain expiration time (e.g. 20 minutes from the creation time), and sends the ST to the web application 102. The web application 102 then sets a cookie, containing the ST, on the client 100. Typically, the ST is a meaningless string value. Consequently, after the expiration time of the ST, storage of the ST in a cookie on the client 100 does not represent a security risk.

After the client 100 has received the ST, the browser that is executing on the client provides the ST to the web application 102 in all subsequent communications for that session with the web application 102. In the example illustrated in FIG. 1, client 100 makes a subsequent request to web application 102 for service X. In response to the request, the web application 102 checks with the authentication service 106 to determine whether the session token (ST) is valid.

In FIG. 1, a request to determine if ST is valid is shown as "V(ST)". If ST is a valid session token (that has not expired), authentication service 106 confirms that ST is valid. In addition, authentication service 106 may refresh the expiration time (e.g. set the expiration time of the session token to 20 minutes in the future). Resetting the expiration time in this manner ensures that the session token will remain valid until the session experiences 20 minutes of inactivity. In FIG. 1, the confirmation message is shown as "OK".

Upon confirming that ST is valid, web application 102 makes a call to the appropriate API. In the present example, the client has requested service X, so web application 102 calls API 108 of service X. The call includes the session token ST. Upon receiving the call, service X asks authentication service 106 to confirm that ST is valid, and proceeds upon receiving confirmation that ST is valid.

Frequently, for a web-based service to perform an operation, the web-based service needs to call one or more other web-based services. Such services are referred to herein as "downstream" services. In the example illustrated in FIG. 1, for service X to perform the operation requested by client 100, service Y needs to perform some additional operation. Consequently, service X calls the API 110 of service Y, and passes the ST in the call. For service Y to tell whether the requested operation is authorized, service Y also needs to authenticate ST. Thus, similar to service X, before performing the requested operation, service Y sends a validation request V(ST) to authentication service 106, and receives a confirmation message from authentication service 106.

At this point, service Y can perform the operation requested by service X, and pass the results to service X. Service X may complete the operation requested by client 100, and pass the results to web application 102. Web application 102 may then send a web page that reflects the results to the browser that is execution on client 100.

While the use of session tokens in the manner illustrated in FIG. 1 provides a significant amount of security to ensure that users cannot perform operations for which they are not authorized, the amount of network traffic that is generated to achieve that security is significant. For example, after the initial log-in operation, each service request generates (N+1) round-trip communications with authentication service 106, where N is the number of services that are called during the performance of the requested operation. Thus, in the example given above in which only two services (X and Y) are called to service the client's request, the request resulted in three round-trip communications with authentication service 106.

Unfortunately, the number of round-trip communications handled by authentication service 106 can quickly become unmanageable. For example, in a web-based application that uses a micro-service architecture, 20 or more services may be called during the execution of a single client request. In massively parallel systems where extremely large numbers of clients concurrently send requests to the same web application, and each of those client requests triggers a large number of round-trip authentication messages, the performance cost of token-based authentication can become unacceptably high.

One technique for reducing the authentication overhead is to make use of JSON Web Tokens (JWTs). JWTs are described, for example, at en.wikipedia.org/wiki/JSON_Web_Token, the contents of which are incorporated herein by reference. A JWT is an encoded data item. Each JWT includes an "unencrypted payload" and a signature. The unencrypted payload may be encoded (e.g. converted to BASE 64) but requires no decryption. The signature is encrypted with the private key of the entity that generated the JWT. Consequently, the signature requires decryption using the public key of the entity that generated the JWT.

In the case where an authentication service generates a JWT, any recipient of the JWT can verify that the authentication service generated the JWT based on the signature of the JWT. Specifically, when constructing the JWT, the authentication service signs the hash of the contents of the JWT (the header+content sections) using its private key. The signature is stored in a signature section of the JWT.

When the services (e.g. X or Y) verify the JWT, they decrypt the signature using the public key to produce the hash. They then compute the hash of the JWT (the same header+content sections) from scratch and check that that value matches what was decrypted. If the comparison results in a match, then it is assumed that (a) the private key of the authentication service was used to encrypt the signature (and therefore the encryption was performed by the authentication service), and (b) the unencrypted payload has not been tampered with subsequent to the generation of the JWT by the authentication service. If they do not match, that means the payload has been modified subsequent to the generation of the JWT.

Figure 2:
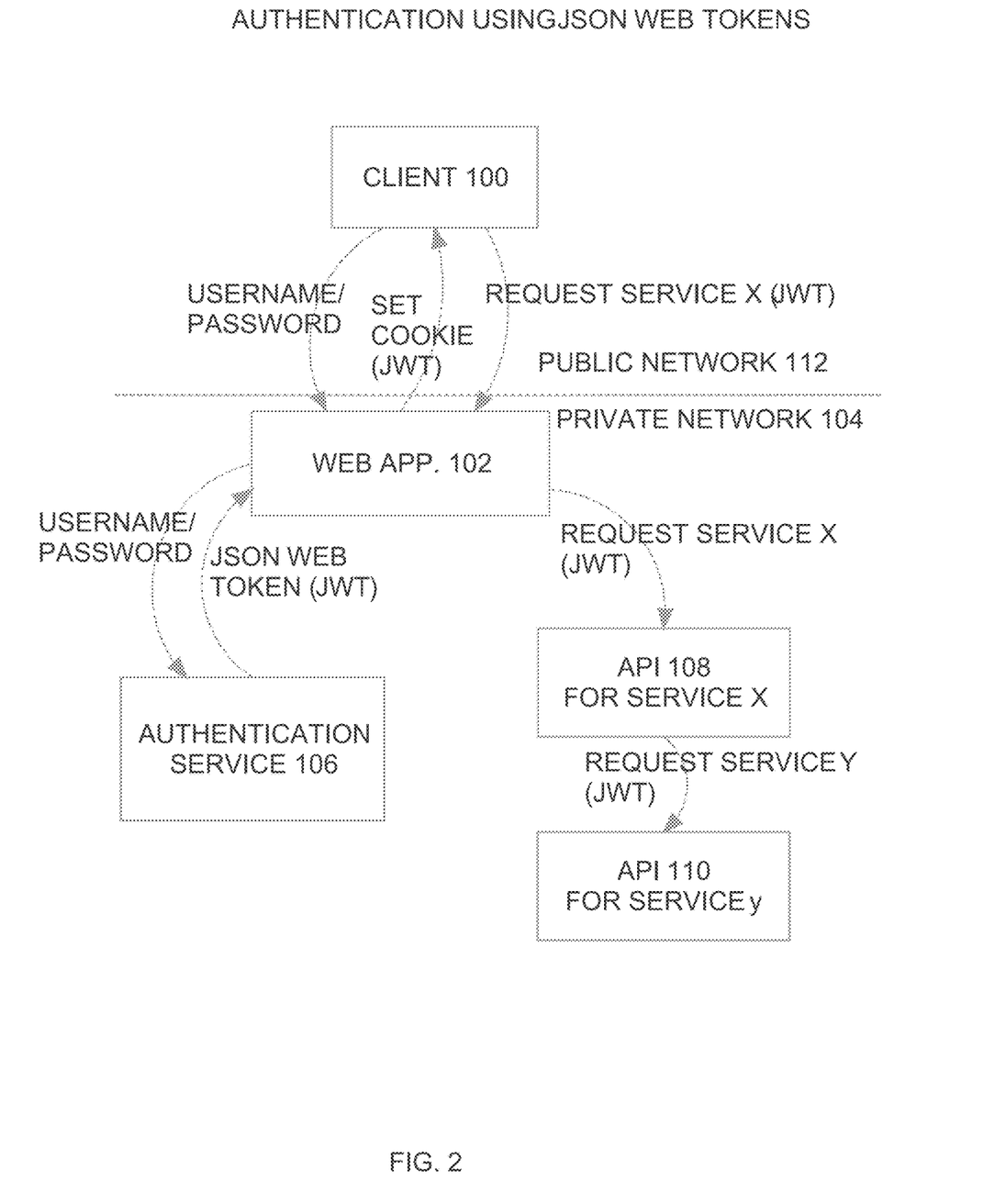
FIG. 2 is a block diagram of a web application system configured to authenticate using JSON Web Tokens.

Enforcing security using JWTs significantly reduces the amount of network traffic generated for authentication. FIG. 2 illustrates a scenario similar to the scenario illustrated in FIG. 1, except that JWTs are used for authentication rather than session tokens. Referring to FIG. 2, client 100 initiates a session with web application 102 by sending to web application a username/password combination. Web application 102, in turn, sends a message to authentication service 106 to confirm that the username/password combination is valid.

After determining that the username/password combination is valid, authentication service 106 does not generate a session token. Instead, authentication service 106 generates a JWT. The payload of the JWT may indicate, for example, the username of the user, the roles (e.g. "user", "administrator", etc.) for which the user is authorized, etc. The JWT is passed back to the web application 102, which sets a cookie that contains the JWT on client 100.

In the subsequent interaction with web application 102 to request service X, the JWT is passed back to web application 102. Without any further interaction with authentication service 106, web application 102 is able to determine that the JWT is authentic, and that (based on the roles specified in the JWT) the interaction with service X is authorized. Upon determining that the requested action is authorized, web application 102 passes the JWT in a call to service X. Based on the JWT, service X is also able to determine that the requested operation is authorized without having to interact with authentication service 106. Service X performs the operation that was requested, and as part of that operation calls service Y. The call to service Y includes the JWT, and allows service Y to determine that the call to service Y was authorized without service Y interacting with authentication service 106. Upon determining that the call to service Y was authorized, service Y performs the requested operation.

By comparing the authentication-related messages shown in FIG. 1 to those shown in FIG. 2, it is clear that the use of JWTs significantly reduces authentication-related overhead. Unfortunately, this authentication-related overhead reduction comes at the cost of security. Specifically, unlike a meaningless session identifier, the information that authentication service 106 stores in the payload of a JWT may be highly sensitive and/or confidential. By storing the JWT in a cookie at client 100, that information becomes available to anyone who has access to client 100. Since client 100 is any computing device that can connect to web application 102 through public network 112, the provider of web application 102 has little to no ability to control access to client 100.

Another problem with performing authentication using JWTs is that, if a malicious user does succeed in obtaining the private key used by the authentication service, that malicious user would potentially have full access to everybody's account. Specifically, with the private key, that user would be able to generate fake JWTs that web application 102, and the services used thereby, will accept as legitimate. Since legitimate JWTs are submitted to the web application 102 from clients on the public network 112, the malicious user need not break into private network 104 to compromise the web application 102 using the fake JWTs.

Based on the foregoing, there is clearly a need to reduce the authentication overhead incurred by web applications that use session tokens for authentication. There is a further need to reduce the authentication overhead of web applications without having to risk storing unencrypted confidential information on devices to which the web application providers cannot control access.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As explained above, using JWT to authenticate users of a web application with each service that is invoked, directly or indirectly, by the web application can significantly reduce the number of authentication-related overhead of the web application. However, storing JWTs on computing devices that access the web application from a public network has the potential to expose highly sensitive and/or confidential information to unknown and untrusted parties. To prevent such exposure, techniques are described herein that use tokenization in conjunction with "behind-the-wall" JWT authentication. "Behind-the-wall" JWT authentication refers to JWT authentication techniques in which the JWT stays exclusively within the private network that is controlled by the web application provider. Because the JWT stays within the private network, the security risk posed by posting the JWT in a client cookie is avoided. However, because JWT is used behind-the-wall to authenticate a user with the services requested by the user, the authentication-related overhead is significantly reduced.

Behind-the-Wall JWT Authentication System

Figure 3:
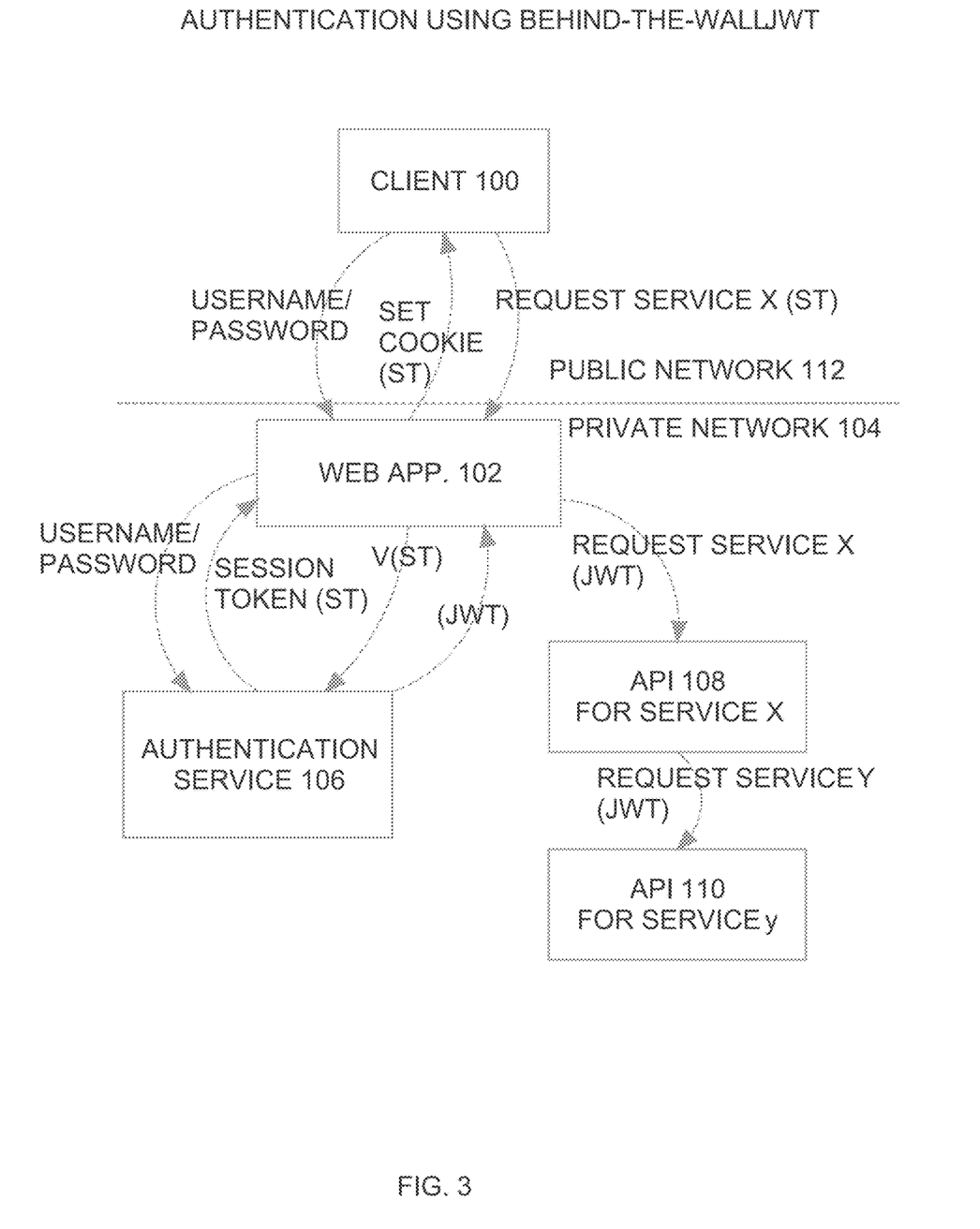
FIG. 3 is a block diagram of a web application system configured to use a combination of tokenization and JSON Web Tokens, according to an embodiment.

FIG. 3 is a block diagram of the system of FIG. 1, where the components of web application 102 that reside within private network 104 are configured to perform behind-the-wall JWT authentication. Although the components on private network 104 are designed to perform behind-the-wall JWT authentication, from the perspective of client 100, the system operates like a system that uses tokenization for authentication.

Specifically, at the initial sign-in, client 100 sends a username/password combination to web application 102, and receives back from web application 102 a session token. The session token is an otherwise meaningless value that is generated by authentication service 106 in response to receiving the username/password combination from web application 102. Also similar to the tokenization system illustrated in FIG. 1, client 100 includes the session token in all subsequent requests to web application 102.

According to one embodiment, after creating a session token, the authentication service 106 stores a hashed version of the session token in a backend database. Because the backend database stores the session token in a hashed format, if the backend database is compromised, none of the affected rows can be used to create a session token that can be passed in via the web tier.

As before, when web application 102 receives a subsequent request from client 100 that includes a session token, web application 102 asks authentication service 106 to authenticate the session token. However, rather than simply responding with a message that indicates that the session token is valid, authentication service 106 generates a limited-duration JWT, and provides the JWT to web application 102. Upon receiving the JWT from authentication service 106, web application 102 sends the JWT to API 108 of service X. Service X, which has the public key of authentication service 106, decrypts the signature of the JWT with the public key and compares the results to hash of the JWT. If the decrypted signature matches the hash, then service X is assured that authentication service has confirmed that the rights/roles specified in the JWT are owned by the user specified in the JWT.

For example, assume that the JWT has the content:

```
{
user: flores
roles: ['user', 'admin']
validuntil: TimeT1
}
Signature: RSA(payload)
```

In this scenario, service X would use the public key of authentication service 106 to decrypt the signature. Once decrypted, the signature is compared with the hash of the JWT. If the two match, then service X knows that authentication service 106 has confirmed that the current call to service X came from user "fibres", and that user "flores" has the roles 'user' and 'admin'.

The "validuntil" element indicates the expiration time of the JWT. The value of the element is TimeT1, which represents an actual time at which the JWT expires. If the expiration time of the JWT has passed, service X does not perform the operation requested by 'fibres', even if the JWT indicates that 'fibres' has the rights/roles that allow him to perform the operation.

Assuming that the JWT has not expired and the roles specified in the JWT allow 'fibres' to perform the requested operation, service X proceeds to perform the requested operation. As explained above, performance of the operation provided by service X requires service X to call service Y through API 110. In the call to API 110 of service Y, service X passes the JWT to service Y.

Upon receiving the call from service X, service Y goes through the same authentication procedures as service X. Specifically, service Y decrypts the signature of the JWT and compares the results to hash of the JWT. If there is a match, and the JWT is not expired, then service Y uses the information contained in the JWT to determine whether 'fibres' has the rights/roles necessary to perform the operation that was requested of service Y. Assuming that 'flores' does have the necessary rights/roles, service Y performs the requested operation.

Although the example of FIG. 3 only shows two services being invoked in response to a client request, the actual number of services that are invoked to service a single client request can be vastly higher. Thus, using behind-the-wall JWT authentication to avoid per-service round-trip interactions with authentication service 106 results in a significant reduction in authentication-related overhead. Further, this overhead reduction is achieved without allowing any confidential information contained in the JWTs to leave the private network 104.

In addition, if a malicious user were to obtain the private key used by authentication service 106 to generate the signature of the JWTs, the malicious user could not make use of the private key from the public network 112. Specifically, any fake JWTs generated by the user would not be accepted by web application 102, because web application 102 is designed to receive session tokens, not JWTs, from devices on public network 112.

Caching Limited-Duration JWTS

In the example illustrated in FIG. 3, web application 102 obtains a limited-duration JWT from authentication service 106 in response to every call from client 100. Because authentication service 106 dynamically generates a new limited-duration JWT for each client call, the expiration time of each JWT need only account for the life-expectancy of a single client call, rather than the life-expectancy of the user session in which the call is made. For example, individual sessions with web application may last up to an hour, so authentication service 106 may cause session tokens to expire after an hour (or after 20 minutes of inactivity). However, if individual client calls never take more than five minutes, then the authentication service 106 may set the expiration times for the limited-duration JWTs to five minutes from the time the JWTs are generated.

In one embodiment, a limited-duration JWT is not generated in response to each post-log-in client request. Instead, a limited-duration JWT is generated in response to the first post-log-in client request, and then cached in association with the session token of the session in which the client request occurred. The entity that maintains the JWT cache may be the web application 102, the authentication service 106, or some other entity within the private network.

In an embodiment that maintains a JWT cache, web application 102 responds to a client call to perform an operation by first causing the JWT cache to be searched for a JWT associated with the session token that was included with the client call. If such a JWT is found in the JWT cache, then that JWT is used to authenticate the request with the services that are invoked to perform the requested operation. If no such JWT is found in the JWT cache, then web application sends the session token to authentication service 106 to obtain a new limited-duration JWT, which is then added to the JWT cache.

In embodiments that make use of a JWT cache, the round-trip communications with authentication service 106 may be even fewer than one round-trip per client call. Specifically, no interaction with authentication service 106 is necessary for client calls when the relevant JWT is found within the JWT cache. However, embodiments that employ a JWT cache should increase the duration of the limited-duration JWTs to account for the fact that, for the JWT cache to be useful, the lifetime of each JWT must be long enough for the JWT to be used for multiple calls. For example, assume that:

the maximum duration of an operation invoked by a single call is one minute, and each JWT should be useable for up to 5 client calls Based on these assumptions, authentication service 106 may set the expiration time to allow each JWT a lifetime of 5 minutes. In addition, the JWT cache may be configured to evict each cache entry after 4 minutes (to ensure that a cached JWT is not used to close to its expiration time).

Example Web Application Operation

Figure 4:
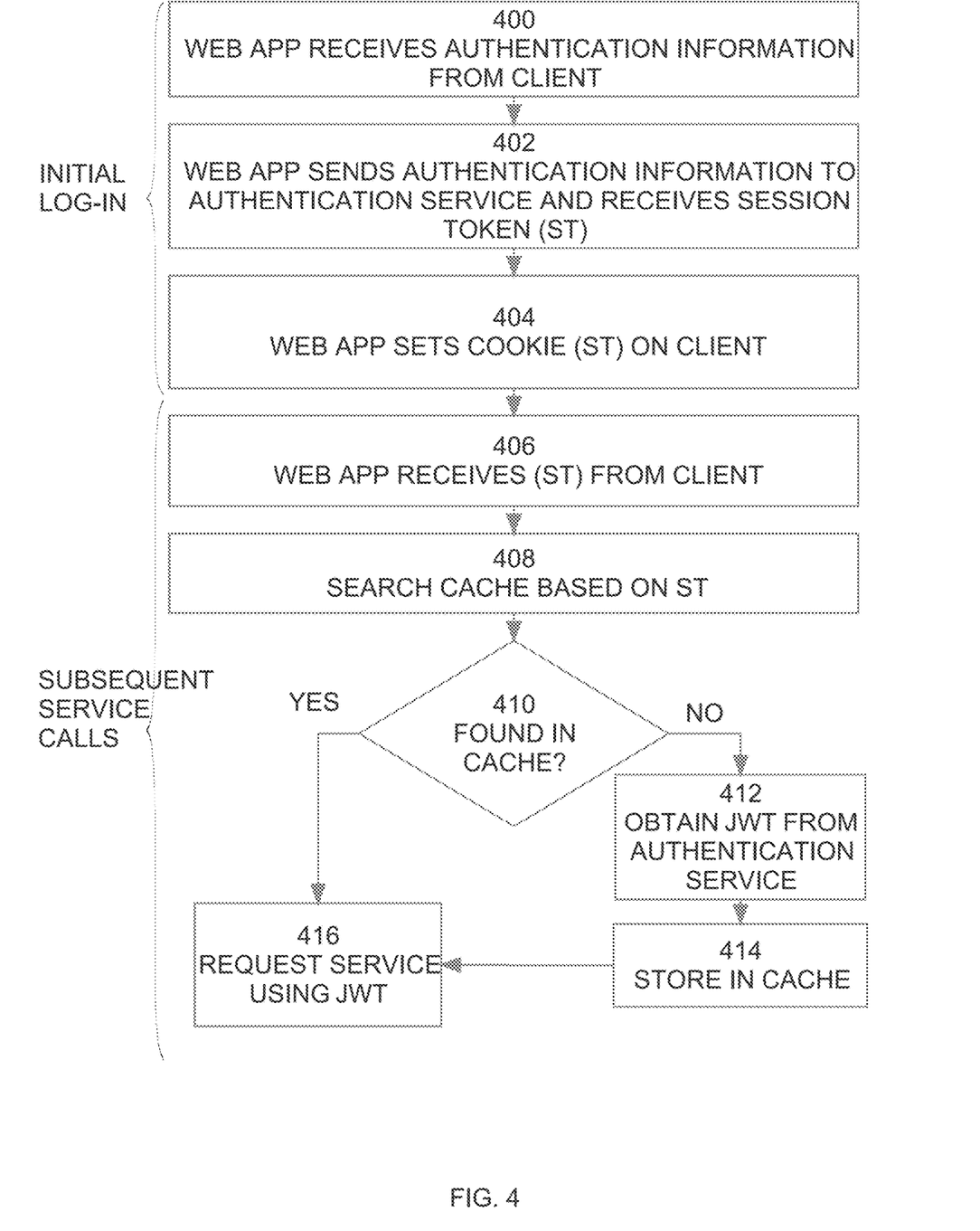
FIG. 4 is a flowchart showing interactions in a system that employs behind-the-wall JWT authentication, according to an embodiment.

FIG. 4 is a flowchart illustrating how a web application may employ behind-the-wall JWT authentication in conjunction with JWT caching, according to an embodiment. Steps 400-404 relate to steps taken by the web application during a user's initial log-in operation. Steps 406-416 relate to steps taken by the web application for subsequent service calls by the client.

Referring to FIG. 1, a step 400, the web application receives authentication information from the client. The authentication information may be, for example, a user's username/password combination. At step 402, the web application sends the authentication information to an authentication service, and receives a session token (ST) from the authentication service. At step 404, the web application posts a cookie containing the session token on the client, so that the session token will be provided by the client to the web application in subsequent request calls.

At step 406, the web application receives a subsequent request call from the client. The subsequent request call includes the session token. At step 408, the web application (or some other behind-the-wall entity that maintains a JWT cache) searches a JWT cache for an entry associated with the session token. In the first request after log-in, the cache will not have any JWT entry associated with the session token, so control passes to step 412.

At step 412, the web application provides the session token to the authentication service and obtains from the authentication service a limited-duration JWT that specifies the roles/rights of the user that corresponds to the session. At step 414, an entry that associates the JWT with the session token is stored in the cache. At step 416, the web application calls the API of the service that was requested by the user, and passes to that service the JWT. That service, and all services uses the JWT to authenticate the request without having to interact with the authentication service. In addition, to the extent that that service needs to call other services, the service passes the JWT to those other services, and those other services also authenticate the requests based on the JWT without having to interact with the authentication service.

For a second request issued by the same client, the cache entry may be found at step 410 if the entry has not yet been evicted/expired from the cache. In such cases, control proceeds directly to step 416 where the JWT found in the cache entry is used to authenticate the request with the appropriate service.

Impersonating Applications

In some situations, it is useful to allow one user to impersonate another user. For example, a help-desk administrator for web application 102 may want to impersonate another user ("user U") to help resolve a problem that user U is experiencing with web application 102. In a system that uses behind-the-wall JWT authentication, such impersonations may be facilitated by creating an "impersonation copy" of the web application 102 that is not exposed to the public network.

According to one embodiment, the administrator is presented with a user interface with controls for specifying the administrator's authentication information along with the identity of the user that is to be impersonated. The information from this user interface is sent to the impersonation copy of the web application to allow the administrator to log in and impersonate user U. In response to the log in request, the impersonation copy sends authentication service 106 the authentication information of the administrator and the data that identifies user U.

Upon receiving the authentication information of the administrator and the data that identifies user U, the authentication service 106 confirms that the administrator is authorized, and generates an "impersonate cookie" with the identity of the user that is to be impersonated (the "actorID"). When the administrator makes requests that include the impersonate cookie to the impersonation copy of the application, the impersonation copy sends the information from the impersonate cookie to the authentication service and the authentication service generates a JWT. In the case of an impersonation, the content of the JWT indicates the roles/rights of the administrator, but also identifies user U as the user who is being impersonated. The impersonation copy of the web application provides the JWT to services in the same manner as illustrated in FIG. 3. Those web services authenticate the requests based on the JWT and the fact that the JWT indicates an administrator role that allows impersonation, and respond to the requests as if the impersonated user (user U) had sent the requests. Consequently, the administrator will see the same output from the impersonation copy of web application 102 as user U sees from the public-facing copy of web application 102.

Improved Security/Increased Efficiency

Behind-the-wall JWT authentication significantly increases security relative to conventional JWT authentication. For example, with behind-the-wall JWT, a malicious user that somehow discovers the private key of the authentication service will not be able to do anything without also breaking the security of the private network system used by the web application. Thus, generation of faked JWTs cannot be used to obtain unauthorized information from the web application, because the services that authenticate using JWTs are not exposed to entities on the public network. Those services interact exclusively with other entities executing on the private network. The web application does interact with entities on the public network, but only does so using session-token-based authentication.

Security is further improved by behind-the-wall JWT authentication because no JWTs are passed to entities in the public network. Consequently, the unencrypted contents of JWTs, which may be sensitive and/or confidential, is not made available to the public.

Behind-the-wall JWT authentication also significantly increases efficiency by reducing the authentication overhead associated with token-based authentication. Specifically, rather than causing N round-trip communications with the authentication service (where N is the number of services invoked in response to a single client call), each client call requires only a single round-trip communication with the authentication service. Further, in embodiments that employ JWT caching, some client calls may not require any communication with the authentication service because the appropriate JWT can be retrieved from the cache.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
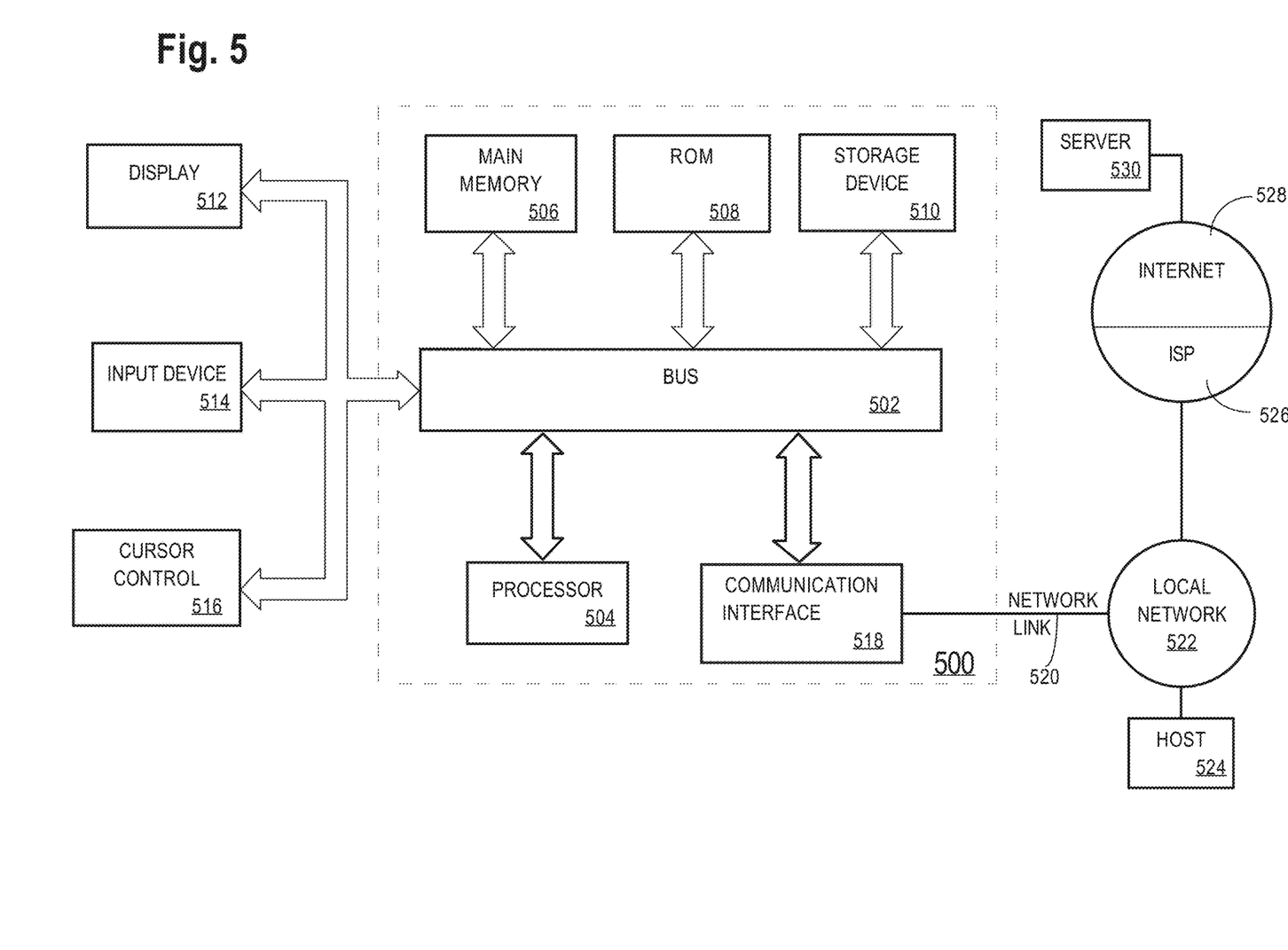
FIG. 5 is a block diagram of a computer system upon which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for improving security of web applications while reducing messaging overhead associated with authentication, comprising:
    receiving, at a web application executing on a secure network from a client that is not executing on the secure network, authentication information associated with a particular user;
    the web application sending the authentication information to an authentication service on the secure network, wherein the authentication service is distinct from the web application;
    in response to receiving the authentication information at the authentication service, the authentication service providing a session token to the web application;
    the web application receiving the session token;
    providing the session token from the web application to the client;
    receiving, at the web application, a service request from the client;
    wherein the service request includes the session token;
    in response to receiving the service request, the web application sending the session token to the authentication service;
    in response to receiving the session token at the authentication service, the authentication service providing the web application with a data item that comprises signature information and an unencrypted payload;
    the web application providing the data item to a first service executing on the secure network; and
    the first service determining whether an operation requested in the service request is authorized based, at least in part, on the signature information and the unencrypted payload;
    wherein determining whether the operation requested in the service request is authorized includes decrypting the signature information with a public key of the authentication service;
    wherein the signature information is encrypted using a private key of the authentication service that corresponds to the public key;
    wherein the unencrypted payload includes information regarding one or more of: one or more rights of the particular user, or one or more roles of the particular user;
    wherein the method is performed by one or more computing devices.

2. The method of claim 1 wherein the data item is a JSON web token.

3. The method of claim 1 wherein:
    the data item is a limited-duration data item; and
    the first service determines whether the operation requested in the service request is authorized further based, at least in part, on whether an expiration time specified in the limited-duration data item has expired.

4. The method of claim 1 wherein:
    the service request is a first service request; and
    the method further comprises:
        after the authentication service provides the web application with the data item, the data item being stored, in association with the session token, in a cache entry in cache;
        receiving, at the web application, a second service request from the client;
        wherein the second service request includes the session token;
        identifying the cache entry, in the cache, based on the session token;
        the web application obtaining the data item from the identified cache entry;
        the web application providing the data item to a second service executing on the secure network; and
        the second service determining whether an operation requested in the second service request is authorized based, at least in part, on the signature information and the unencrypted payload from the data item.

5. The method of claim 4 wherein:
    the data item is a limited-duration item that expires after a first duration;
    the cache entry is set to expire after a second duration; and
    the second duration is less than the first duration.

6. The method of claim 1 wherein:
the first service determines that the operation requested in the service request requires the first service to request that a second service perform a particular operation;
the first service calling the second service and providing the data item to the second service; and
the second service determining whether the particular operation requested by the first service is authorized based, at least in part, on the signature information and the unencrypted payload.

7. The method of claim 1 further comprising:
receiving, at an impersonation copy of the web application:
administrator-level authentication information associated with an administrator, and
data that identifies a to-be-impersonated user;
wherein the impersonation copy executes on the secure network and is not accessible by entities that are not on the secure network;
the impersonation copy of the web application sending the administrator-level authentication information to the authentication service on the secure network;
in response to receiving the administrator-level authentication information at the authentication service, the authentication service providing an impersonation session token to the impersonation copy of the web application;
receiving, at the impersonation copy of the web application, a particular service request that includes the impersonation session token;
in response to the particular service request, the impersonation copy of the web application sending the impersonation session token to the authentication service;
in response to receiving the impersonation session token at the authentication service, the authentication service providing the impersonation copy of the web application with a particular data item that comprises particular signature information and a particular unencrypted payload;
wherein the particular data item identifies:
one or more rights of the administrator, and
the to-be-impersonated user;
the impersonation copy of the web application providing the particular data item to a particular service executing on the secure network; and
the particular service determining whether a particular operation requested in the particular service request is authorized based, at least in part, on the particular signature information and the particular unencrypted payload; and
the particular service providing output as if the particular operation had been requested by the to-be-impersonated user.

8. One or more non-transitory computer-readable media storing one or more sequences of instructions comprising instructions that, when executed by one or more computing devices, cause:
receiving, at a web application executing on a secure network from a client that is not executing on the secure network, authentication information associated with a particular user;
the web application sending the authentication information to an authentication service on the secure network, wherein the authentication service is distinct from the web application;
in response to receiving the authentication information at the authentication service, the authentication service providing a session token to the web application;
the web application receiving the session token;
providing the session token from the web application to the client;
receiving, at the web application, a service request from the client;
wherein the service request includes the session token;
in response to receiving the service request, the web application sending the session token to the authentication service;
in response to receiving the session token at the authentication service, the authentication service providing the web application with a data item that comprises signature information and an unencrypted payload;
the web application providing the data item to a first service executing on the secure network; and
the first service determining whether an operation requested in the service request is authorized based, at least in part, on the signature information and the unencrypted payload;
wherein determining whether the operation requested in the service request is authorized includes decrypting the signature information with a public key of the authentication service;
wherein the signature information is encrypted using a private key of the authentication service that corresponds to the public key;
wherein the unencrypted payload includes information regarding one or more of: one or more rights of the particular user, or one or more roles of the particular user.

9. The one or more non-transitory computer-readable media of claim 8 wherein the data item is a JSON web token.

10. The one or more non-transitory computer-readable media of claim 8 wherein:
the data item is a limited-duration data item; and
the first service determines whether the operation requested in the service request is authorized further based, at least in part, on whether an expiration time specified in the limited-duration data item has expired.

11. The one or more non-transitory computer-readable media of claim 8 wherein:
the service request is a first service request; and
the one or more sequences of instructions further comprise instructions that, when executed by one or more computing devices, cause:
after the authentication service provides the web application with the data item, the data item being stored, in association with the session token, in a cache entry in cache;
receiving, at the web application, a second service request from the client;
wherein the second service request includes the session token;
identifying the cache entry, in the cache, based on the session token;
the web application obtaining the data item from the identified cache entry;
the web application providing the data item to a second service executing on the secure network; and
the second service determining whether an operation requested in the second service request is authorized based, at least in part, on the signature information and the unencrypted payload from the data item.

12. The one or more non-transitory computer-readable media of claim 11 wherein:
the data item is a limited-duration item that expires after a first duration;
the cache entry is set to expire after a second duration; and
the second duration is less than the first duration.

13. The one or more non-transitory computer-readable media of claim 8 wherein:
the first service determines that the operation requested in the service request requires the first service to request that a second service perform a particular operation;
the first service calling the second service and providing the data item to the second service; and
the second service determining whether the particular operation requested by the first service is authorized based, at least in part, on the signature information and the unencrypted payload.

14. The one or more non-transitory computer-readable media of claim 8 wherein the one or more sequences of instructions comprise instructions that, when executed by one or more computing devices, cause:
receiving, at an impersonation copy of the web application:
administrator-level authentication information associated with an administrator, and
data that identifies a to-be-impersonated user;
wherein the impersonation copy executes on the secure network and is not accessible by entities that are not on the secure network;
the impersonation copy of the web application sending the administrator-level authentication information to the authentication service on the secure network;
in response to receiving the administrator-level authentication information at the authentication service, the authentication service providing an impersonation session token to the impersonation copy of the web application;
receiving, at the impersonation copy of the web application, a particular service request that includes the impersonation session token;
in response to the particular service request, the impersonation copy of the web application sending the impersonation session token to the authentication service;
in response to receiving the impersonation session token at the authentication service, the authentication service providing the impersonation copy of the web application with a particular data item that comprises particular signature information and a particular unencrypted payload;
wherein the particular data item identifies:
one or more rights of the administrator, and
the to-be-impersonated user;
the impersonation copy of the web application providing the particular data item to a particular service executing on the secure network; and
the particular service determining whether a particular operation requested in the particular service request is authorized based, at least in part, on the particular signature information and the particular unencrypted payload; and
the particular service providing output as if the particular operation had been requested by the to-be-impersonated user.

* * * * *